United States Patent
Pentz et al.

(10) Patent No.: US 6,824,337 B2
(45) Date of Patent: Nov. 30, 2004

(54) MACHINE TOOL MOUNTED MARKING APPARATUS AND METHOD

(75) Inventors: Richard E. Pentz, West Simsbury, CT (US); John D. Jacobsen, Unionville, CT (US); William D. Sangster, Deep River, CT (US)

(73) Assignee: Dapra Corporation, Bloomfield, CT (US)

( * ) Notice: Subject to any disclaimer, the term of this patent is extended or adjusted under 35 U.S.C. 154(b) by 252 days.

(21) Appl. No.: 10/239,261

(22) PCT Filed: Mar. 16, 2001

(86) PCT No.: PCT/US01/08448

§ 371 (c)(1),
(2), (4) Date: Sep. 19, 2002

(87) PCT Pub. No.: WO01/70452

PCT Pub. Date: Sep. 27, 2001

(65) Prior Publication Data

US 2003/0039524 A1 Feb. 27, 2003

Related U.S. Application Data

(60) Provisional application No. 60/190,753, filed on Nov. 20, 2000.

(51) Int. Cl.⁷ .............................................. B32P 23/00
(52) U.S. Cl. .................... 409/132; 409/234; 72/453.01; 279/145
(58) Field of Search ................................ 409/131, 132, 409/136, 144, 232, 234; 279/8, 83, 143, 145; 72/453.01, 466.7, 476; 33/18.1; 408/238, 239 A

(56) References Cited

U.S. PATENT DOCUMENTS

| | | | |
|---|---|---|---|
| 1,177,344 A | * | 3/1916 | Linderman .................. 408/79 |
| 2,051,102 A | | 8/1936 | Pitman ....................... 90/13.1 |
| 2,413,518 A | | 12/1946 | Rechton et al. ............... 153/21 |
| 4,067,252 A | | 1/1978 | Peddinghaus et al. ........ 83/571 |
| 4,642,005 A | | 2/1987 | Kondo et al. ............... 409/232 |
| 5,403,134 A | * | 4/1995 | Andersson et al. ......... 409/234 |
| 5,873,687 A | | 2/1999 | Watanabe ................... 409/234 |
| 6,427,357 B1 | | 8/2002 | Piper ........................... 33/679 |

* cited by examiner

*Primary Examiner*—Daniel W. Howell
(74) *Attorney, Agent, or Firm*—Wiggin and Dana LLP; Dale L. Carlson; Michael K. Kinney

(57) ABSTRACT

A nosepiece adapter (10) for connecting a nosepiece (20) to a tool holder shank (30), wherein said nosepiece adapter (10) is comprised of a shaft (60) and an opposing nosepiece end (50) to receive said nosepiece (20), wherein a longitudinal cavity (70) extends through said nosepiece adapter (10) and opens at both ends of said nosepiece adapter (10); an escape valve cavity (80) extending from the outer surface of the nosepiece end (50) to said longitudinal cavity (70); wherein said shaft (60) includes a shaft attachment means for connecting said shaft (60) to said tool holder shank (30); and, wherein said nosepiece end (50) includes a nosepiece attachment means to connect said nosepiece (20) to said nosepiece end (50).

17 Claims, 6 Drawing Sheets

MACHINE TOOL MOUNTED MARKING APPARATUS AND METHOD

This application claims benefit of Ser. No. 60/190,753 filed Mar. 20, 2000.

FIELD OF THE INVENTION

The present invention relates to a machine tool mounted apparatus and method to mark a work piece, and more particularly relates to an apparatus and method that allows marking and machining to be performed using the same equipment.

BACKGROUND OF INVENTION

Numerous marking methods such as stamping, roll stamping, vibratory peening, electrochemical etching, and laser etching are commonly employed to mark work pieces. Ordinarily, the marking process is performed as an operation separate from work piece machining operations. Under these conventional systems, an element or work piece is machined to a desired shape and size, removed from the machining equipment, appropriately positioned in specialized marking equipment, and marked with the appropriate emblem, part number, etc.

Machining and marking the work piece with the same equipment eliminates various costs, including: marking equipment, handling and storage of work pieces, floor space, work piece specific tooling and fixtures, and labor costs. Therefore, there exists a need to develop an apparatus that allows machining and marking to be performed on the same equipment and thereby avoid these additional costs. The disclosed machine tool mounted nosepiece integrates the marking process with the work piece machining operation reducing or eliminating these costs.

SUMMARY OF THE INVENTION

It is an object of the present invention to provide a marking method and apparatus capable of integration into work piece machining operations.

It is another object of the present invention to provide an adapter to connect a marking apparatus to a basic tool holder shank and thereby to a machine tool spindle utilizing existing tool holding techniques.

It is yet another object of the present invention to provide a combination tool holder shank and marking device or nosepiece using the aforementioned adapter.

The present invention describes an adapter that may be suitably employed to modify equipment used to machine a work piece to also mark the work piece. A basic configuration of the machine tool is a tool holder shank (also referred to as a "basic tool holder shank") that fits directly into the spindle of the machining equipment and holds the machining tools. The end of the tool holder shank opposite the spindle is called a tool adapter. Acceptable tool holder shank styles include, without limitation, CAT V Flanges (30, 40, 45, and 50), BT Flanges (30, 35, 40, and 50), NMTB, R8, and Morse Taper (2, 3, 4, or 5). Acceptable tool adapters include, without limitation, end mill holders, milling chucks, and collet chucks. Further, coolant adapters and coolant induced toolholders may be used. Note that the spindle may be rotating or nonrotating; however, a nonrotating spindle is preferred.

A preferable example of a tool holder shank and tool adapter for the purpose of the present invention is an end mill holder with a CAT 30, 40, or 50 V-Flange Adapter manufactured by Kennametal, Inc. of Latrobe, Pa.

In one embodiment of the present invention, a nosepiece adapter for connecting a nosepiece to the tool adapter end of the tool holder shank is disclosed. The nosepiece adapter is comprised of a shaft and an opposing nosepiece end. The nosepiece end is designed to receive a nosepiece commonly known in the art or specifically designed to fit into the nosepiece adapter. A longitudinal cavity extends through the nosepiece adapter and opens at both ends. The shaft is sized to attach to the tool adapter end of a basic tool holder shank and may include a shaft attachment means. As will be discussed below, this longitudinal cavity receives pneumatic gas, preferably pneumatic air, to activate the stylus of the nosepiece to mark a work piece or element.

Preferably, the nosepiece is a modified Pneumatic Nosepiece (Part No. PD05100), manufactured by Dapra Corporation of Bloomfield, Conn. having a Pneumatic Stylus (Part No. PC03980) also manufactured by Dapra Corporation, and a retraction means, such as one or more Compression Springs (Part No. 1753) manufactured by Century Spring Corporation of Los Angeles, Calif.

A second embodiment of the present invention is a combination tool holder shank and nosepiece wherein the nosepiece is connected to the tool adapter end of the tool holder shank using the aforementioned nosepiece adapter.

A third embodiment of the present invention is a method of machining and marking an element using the same equipment by suitably employing the nosepiece adapter described above.

The details of one or more embodiments of the invention are set forth in the accompanying drawings and the description below. Other features, objects and advantages of the invention will be apparent from the description and drawings, and from the claims.

DETAILED DESCRIPTION OF THE DRAWINGS

Figure 1:
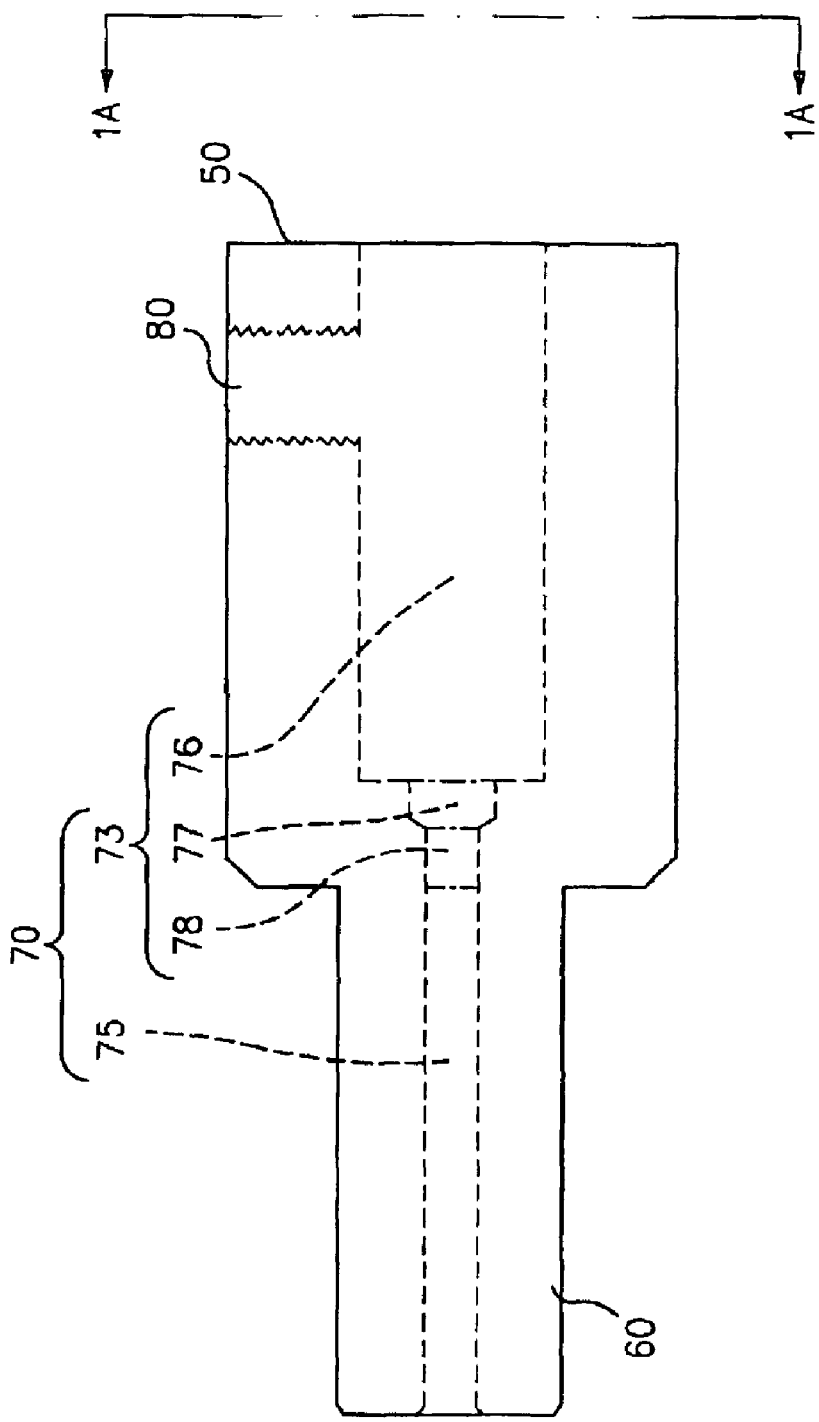
FIG. 1 is a longitudinal cross-sectional view showing the nosepiece adapter.

Referring to FIG. 1, nosepiece adapter 10 is designed to connect a modified nosepiece 20 (not shown) to the tool adapter of a basic tool holder shank 30 (not shown), preferably a CAT 30, 40 or 50 end mill holder. Most preferably, the tool holder is a CAT 40 V-Flange Adapter manufactured by Kennametal, Inc. of Latrobe, Pa. Preferably, the nosepiece 20 is suitably modified to fit into the nosepiece adapter 10, such as a modified Pneumatic Nosepiece (Part No. PD05100) manufactured by Dapra Corporation of Bloomfield, Conn. Preferably, this nosepiece is equipped with a Pneumatic Stylus (Part No. PC03980) also manufactured by Dapra Corporation and one or more Compression Springs (Part No. 1753) manufactured by Century Spring Corporation of Los Angeles, Calif. While the aforementioned nosepiece, stylus, and springs are preferable, other components may be used with desirous results.

In general, the nosepiece 20 is a pneumatically powered apparatus that marks a work piece surface by forming patterns of depressions (dots) of a controlled depth and size. These dots are formed by the impact of a stylus upon the work piece material. The types of markings produced from a nosepiece type marking device include, but are not limited to, work piece part numbers, serial numbers, date coded data, logos, two dimensional matrix codes and other alpha-numeric and punctuation characters of various fonts and text sizes.

Returning to FIG. 1, the nosepiece adapter 10 has a shaft 60 and an opposing nosepiece end 50. The nosepiece end 50 is capable of receiving a nosepiece 20. The shaft 60 is designed to connect with the tool adapter end of a basic tool holder shank 30 (not shown) and may include a shaft attachment means as described below. The nosepiece adapter 10 has a longitudinal cavity 70 extending through the shaft 60 into the nosepiece end 50 and opening at both ends of the nosepiece adapter 10. The cavity 70 is preferably comprised of two cavity regions, namely a nosepiece cavity 73 within the nosepiece end 50 and a shaft cavity 75 within the shaft 60. The shaft cavity 75 and the nosepiece cavity 73 are in communication with each other.

The shaft 60 has an outer diameter equal to between about 0.5 and 1.0 inches, preferably 0.75 inches, and has a length equal to between about 1.5 and 2.0 inches, preferably 1.75 inches. The nosepiece end 50 has an outer diameter equal to between about 1.25 and 1.75 inches, preferably 1.50 inches. The adapter has an overall length equal to between about 3.0 and 4.0 inches, preferably 3.75 inches.

Figure 2:
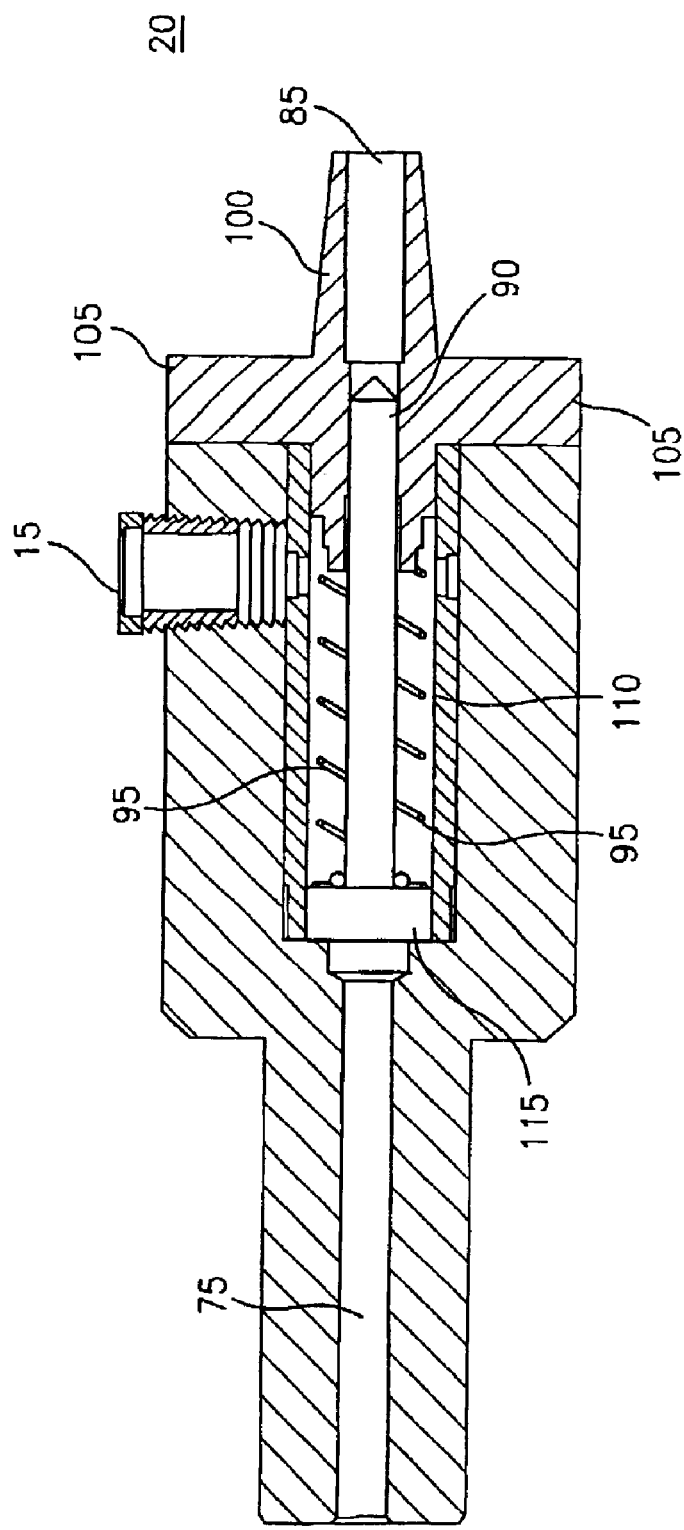
FIG. 2 is a longitudinal cross-sectional view of the nosepiece adapter having a nosepiece fitted into its nosepiece cavity.

The nosepiece cavity 73 is designed to receive a modified nosepiece 20 as shown in FIG. 2. Preferably, the nosepiece cavity 73 is designed to receive the aforementioned modified Pneumatic Nosepiece manufactured by Dapra Corporation. Accordingly, this cavity 73 is preferably comprised of three longitudinal cavities in communication with one another as shown in FIG. 1. Accordingly, the first cavity 76 extends between about 1.5 and 1.8 inches from the nosepiece end 50 toward the shaft 60 and has a first inner diameter equal to between about 0.5 and 0.75 inches. Most preferably, this cavity 76 extends about 1.634 inches and has an inner diameter equal to about 0.630 inches. A second longitudinal cavity 77 preferably extends between about 0.1 and 0.2 inches from the first cavity 76 towards the shaft 60 and has a second inner diameter equal to between about 0.2 and 0.4 inches. Most preferably, this cavity 77 extends about 0.116 inches and has an inner diameter equal to about 0.3125 inches. A third longitudinal cavity 78 extends from the second cavity 77 to the shaft cavity 75 and has an inner diameter equal to between about 0.1 and 0.3 inches, most preferably, this inner diameter is equal to about 0.1875 inches. Cavities 75, 76, 77, and 78 are in communication with one another.

The nosepiece adapter 10 further includes an escape valve cavity 80 extending from the outer surface of the nosepiece end 50 of the nosepiece adapter 10 to the nosepiece cavity 73. The escape valve cavity 80 acts as a rudimentary noise reducer and, more importantly, prevents contaminants from interfering with the operation of the nosepiece 20. Therefore, the escape valve cavity 80 preferably extends perpendicular to and connects with the first longitudinal cavity 76. The escape valve cavity 80 has a preferable through diameter equal to between about 0.2 and 0.4 inches; most preferably, this diameter equals about 0.3125 inches. The escape valve cavity 80 may optionally receive a breather vent 15 shown in FIG. 2. A preferred breather vent 15 is a Breather Vent (Part No. B1MN) manufactured by Numatics, Inc. of Highland, Mich. This breather vent 15 may be threadedly attached to the escape valve cavity 80. Throughout this application the terms breather vent and breather vent silencer are intended to refer to the same element 15.

Figure 1A:
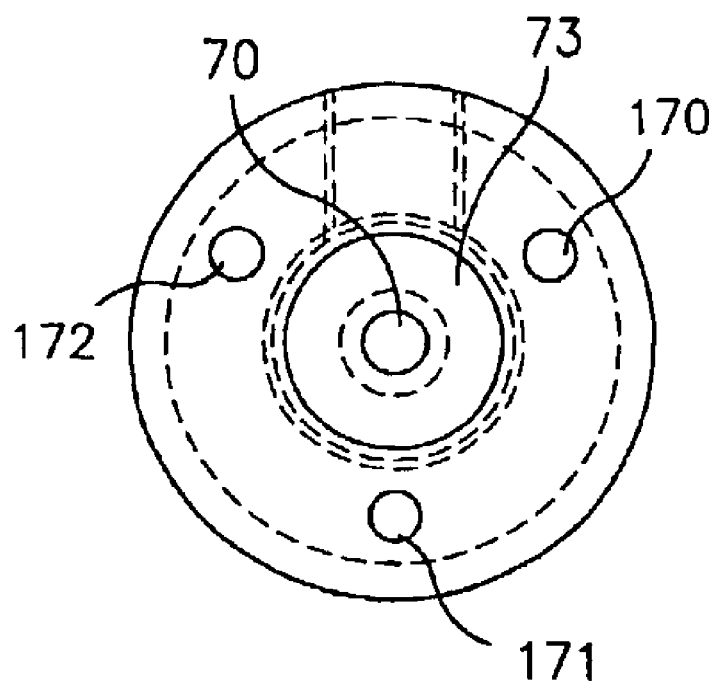
FIG. 1A is a cross-sectional view of the nosepiece end of the nosepiece adapter looking along line 1A—1A.

A modified nosepiece 20 may be attached to the nosepiece cavity 73 using a nosepiece attachment means as shown in FIG. 1A which depicts the nosepiece end 50 along view 1A—1A. In this embodiment, the nosepiece attachment means includes three threaded holes 170, 171 and 172 to receive screws through the nosepiece flange 105 shown in FIG. 2. While three screw holes are shown herein, any plurality of screw holes or apertures may be suitably employed. Additional suitable nosepiece attachment means includes without limitation: welding, soldering and bolting. Likewise the nosepiece cavity 73 may be threaded to match a threaded nosepiece shaft 170.

Figure 1B:
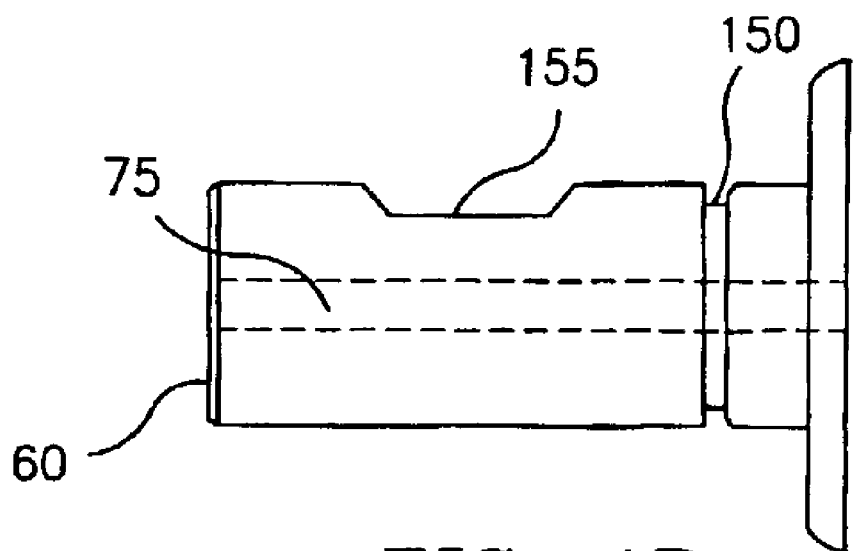
FIG. 1B is a detailed planar view of the shaft of the nosepiece adapter.
Figure 3:
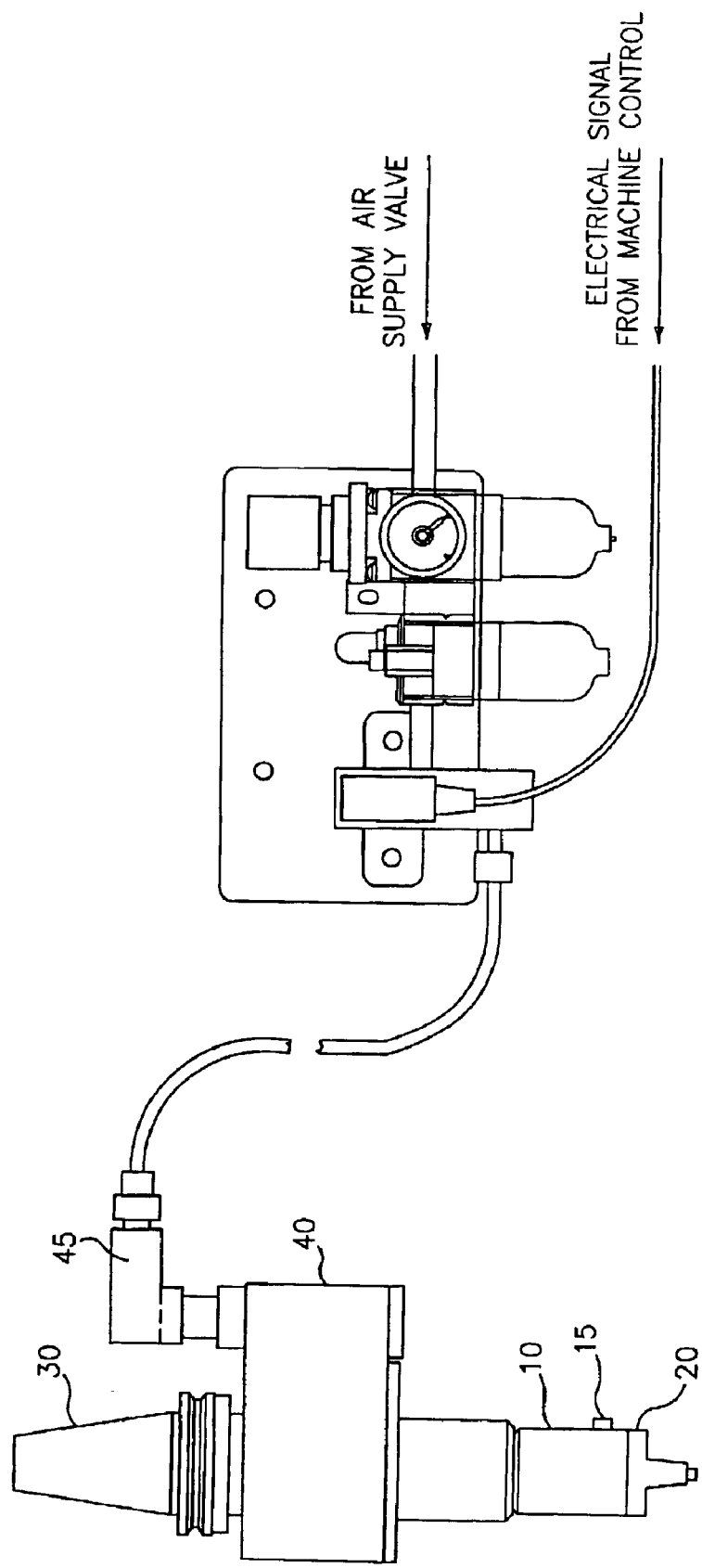
FIG. 3 is a planar view of an embodiment of a combination basic tool holder shank and nosepiece having a pneumatic gas source provided via a coolant adapter.
Figure 4:
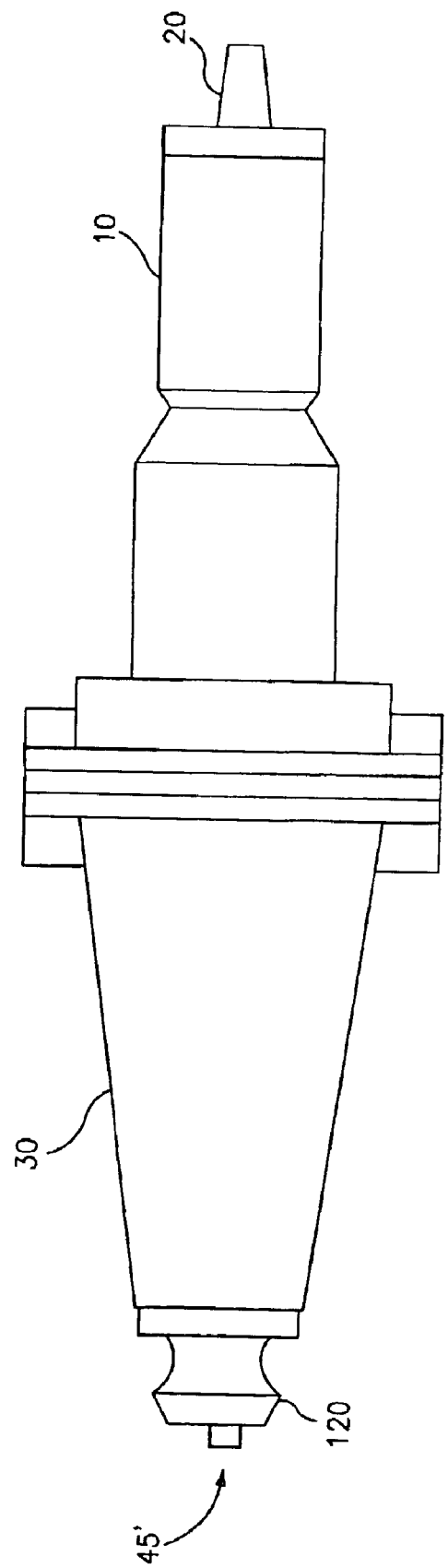
FIG. 4 is a planar view of another embodiment of a combination basic tool holder shank and nosepiece configured to receive pneumatic gas via its retention knob.

The shaft 60 may be attached to the tool adapter end of a basic tool holder shank 30 shown in FIGS. 3 and 4 using a shaft attachment means as shown in FIG. 1B. As shown in FIG. 1B, which depicts a detail of shaft 60 with a shaft cavity 75, the shaft attachment means is preferably a Weldon style flat 155 and screw. The screw fastens through a hole in the tool adapter and secures the shaft 60 of the nosepiece adapter 10 in the shank portion of the tool holder shank (such as an end mill holder) by fastening onto the Weldon style flat 155. The Weldon style flat 155 is preferred as it constrains the adapter from accidentally dislodging under air pressure in the event that the screw loosens during normal operation. The screw braces against the edge of the Weldon style flat 155 thereby preventing accidental dislodging. Further, the location and length of the Weldon style flat 155 acts as a guide to ensure proper placement of the shaft 60 into the tool adapter end of the tool holder shank 30. Additional suitable shaft attachment means includes without limitation: welding, soldering, bolting and screwing. An optional O-ring 150 serves as an air pressure seal and prevents contaminants from entering the cavity.

FIG. 2 is a drawing of the nosepiece adapter 10 having a nosepiece 20 fitted into its nosepiece cavity 73. Nosepiece adapter 10 optionally includes a breather vent 15 connected to the escape valve cavity 80. In this embodiment, nosepiece 20 is comprised of a nose 100 extending from nosepiece flange 105 and a nosepiece shaft 110 extending from the nosepiece flange 105 opposite the nose 100. The nose 100, the nosepiece shaft 110 and nosepiece flange 105 have a inner diameter forming a stylus cavity 85 that extends longitudinally through the nosepiece shaft 110 and nose 100. A stylus 90 is positioned in the stylus cavity 85 so that its tip may extend and retract through the nose 100. Preferably, the stylus is a Pneumatic Stylus (Part No. PC03980) manufactured by Dapra Corporation of Bloomfield, Conn. Retraction means returns the stylus to the retracted position after a dot is imprinted on the work piece or element. A preferred retraction means is one or more springs 95 which attach the stylus 90 to the nosepiece flange 105 and operate to return the stylus to a retracted position. Most preferably, one or more springs 95 connect the stylus 90 to the nosepiece flange 105 via a base plate 115, wherein the base plate 115 is positioned on the stylus opposite its tip. Preferable springs are Compression Springs (Part No. 1753) manufactured by Century Spring Corp. of Los Angeles, Calif. The nosepiece 20 is configured so that pneumatic air shown in FIGS. 3 and 4 may activate the stylus 90 and one or more springs 95 retract the stylus.

The nosepiece function is similar to a single acting, spring returned piston and cylinder. At rest in the retracted position the stylus 90 is held at the retracted end of the stroke contained by a retraction means such as one or more compression springs 95, elastomeric element, or a pneumatic air return. The elastomeric element acts in the same manner as a spring but consists of an elastomeric material rather than a wound metal. Further, one skilled in the art would recognize that pneumatic air operating in the direction opposite the activating pneumatic air may be suitably employed to retract the stylus 90. In a preferably embodiment, the retraction means is one or more compression springs 95.

When actuated by compressed air through the shaft cavity 75, the stylus 90 is propelled through the nose 100 to the extended position. The motion of the stylus 90 compresses the one or more springs 95 or elastomeric element and at full extension is arrested by contact against the nosepiece flange 105. In normal operation, the proximity of work piece marking surface prevents full extension; the stylus tip impacts the work piece forming a dot on the work piece. The retraction means returns stylus tip within the nose 100 after an element is marked.

FIGS. 3 and 4 depict two preferred embodiments of a combination tool holder shank 30 and nosepiece 20 using the nosepiece adapter 10 described above. The general configuration consists of a nosepiece adapter 10 with a nosepiece 20 wherein the shaft 60 of the nosepiece adapter 10 connects with the tool adapter end of the tool holder shank 30.

FIG. 3 details an embodiment of a combination basic tool holder shank 30 and nosepiece 20 having a external pneumatic gas inlet 45, preferably pneumatic air, provided through a coolant adapter and mounting block 40. The external pneumatic gas may be provided to the tool adapter either manually through a coolant induced tool holder or via a pin through the mounting block from a conventional compressor. Accordingly, a coolant adapter and mounting block 40 may be affixed to the tool shank and a stationary element of the machine tool, respectively. More specifically, the coolant adapter is positioned between the tool holder shank and the tool adapter. The coolant adapter attaches to the mounting block which, in turn, is attached to a flange of the machine tool. The coolant adapter may also include seals, fluid passages, and a means of connection to a pneumatic gas source, and a means of locating and securing a cutting tool. While a nonrotating coolant adapter is preferred, one skilled in the art would recognize that a rotating or nonrotating coolant adapter may be suitably employed.

While any commonly available coolant adapters/mounting blocks 40 may be used, a Rotary Coolant Adapter (CV40REM075600) manufactured by Kennametal, Inc. of Latrobe, Pa. is preferred. Other acceptable coolant adapters/mounting blocks are available from The George Whalley Co. of Cleveland, Ohio and others. Coolant induced tool holders may be obtained from Collis Tool Corp. of Camanche, Iowa. The type of rotary coolant adapter 40 depicted in FIG. 3 is a preferable embodiment for use in a machine tool with a taper shank spindle and equipped with an automatic tool changer. One skilled in the art would recognize that other types of spindles may be used and that manual tool changing may be performed. The marking application disclosed herein does not require rotation of the spindle and the rotary coolant adapter serves primarily to hold and introduce compressed air to the marking head. The rotary coolant adapter serves to prevent catastrophic failure should the machine tool spindle be inadvertently activated. In general, the coolant adapter connects to the tool holder shank while the mounting block attaches to the machine tool via threaded holes in the machine tool. These holes may be predrilled or specifically drilled and tapped to allow attachment. One skilled in the art would recognize that other coolant adapters or comparable elements may be employed depending on the machine tool configuration.

In this embodiment, the pneumatic gas is connected directly to an external regulator/filter that can be adjusted to the pressure required to obtain the proper marking depth. The pressure adjusted external pneumatic gas is then ported to the nosepiece 20 via the coolant adapter 40 and nosepiece adapter 10 as shown by numeral 45. The pressure regulating pneumatic components include, but are not necessarily limited to, a manual shut off valve, a pressure regulator with pressure gauge and coalescing filter, a lubricator, an electrically operated solenoid valve, and associated fittings, wires, and tubing. These components are selected to have the appropriate capacity to supply the correct air flow and response for the marking head and are commercially available from manufacturers such as: Numatics, Inc. of Highland, Mich., SMC Pneumatic, Inc. of Indianapolis, Ind., Festo Corporation of Happauge, N.Y., and numerous others.

FIG. 4 depicts a another embodiment of a combination tool holder shank 30 (in this case an end mill holder) and nosepiece 20 designed to receive an internal pneumatic air, as shown by numeral 45', through its retention knob 120. In this embodiment, the pneumatic gas source is connected to a regulator/filter that regulates the air for all machine tool uses. The regulated pneumatic gas is ported to a connector on the machine tool that allows the pneumatic gas to flow freely through the spindle to the tool holder shank. In the depicted embodiment, the tool adapter and tool holder shank 30 is an end mill holder with a retention knob 120 that is generally used to stabilize the tool holder shank in the machine tool spindle. This retention knob 120 is equipped with a through hole, also called a coolant hole, to receive pneumatic gas to actuate the stylus of the nosepiece. In this configuration, the pneumatic gas used to operate activate the stylus is compressed air conventionally used during the machining operation.

In both embodiments shown in FIGS. 3 and 4, a solenoid valve that is electrically signaled by the machine tool control preferably controls the extension stroke and the retraction stroke venting of the pneumatic gas (preferably pneumatic air). Ambient air is vented through escape valve cavity 80 as required. A breather vent 15, preferably sintered breather vent silencer, prevents contaminants from entering the stylus cavity 85. One skilled in the art would recognize that the use of a solenoid valve is a preference and other equipment may be suitably employed.

The present invention further includes a method of machining and marking an element using the combination basic tool holder shank and nosepiece described in detail above. A work piece is fed into a machine tool equipped with one or more above described nosepiece adapters. The work piece is machined and marked on the machine tool. One skilled in the art would recognize that a work piece may be marked at any time during machining. The ideal timing of the marking process depends on the nature of the work piece being machined and the end product being developed. Thus, the work piece may be marked prior to machining, during machining or after machining.

The machined element is marked by positioning the nosepiece 20 on proximity to the desired marking surface of the work piece element. The stylus of the nosepiece is activated by pneumatic gas, preferably pneumatic air, provided either from the machine spindle through the retention knob or from an external source through the rotary coolant adapter and mounting block. The nosepiece is activated by providing the pneumatic gas at a first flow rate through the basic tool holder shank and nosepiece adapter and optionally through a coolant adapter, depending on the source of the pneumatic gas. The stylus of the nosepiece is thereby extended to contact the machined element. The flow rate is then reduced allowing the retraction means, preferably one or more compression springs, to retract the stylus tip.

Figure 5:
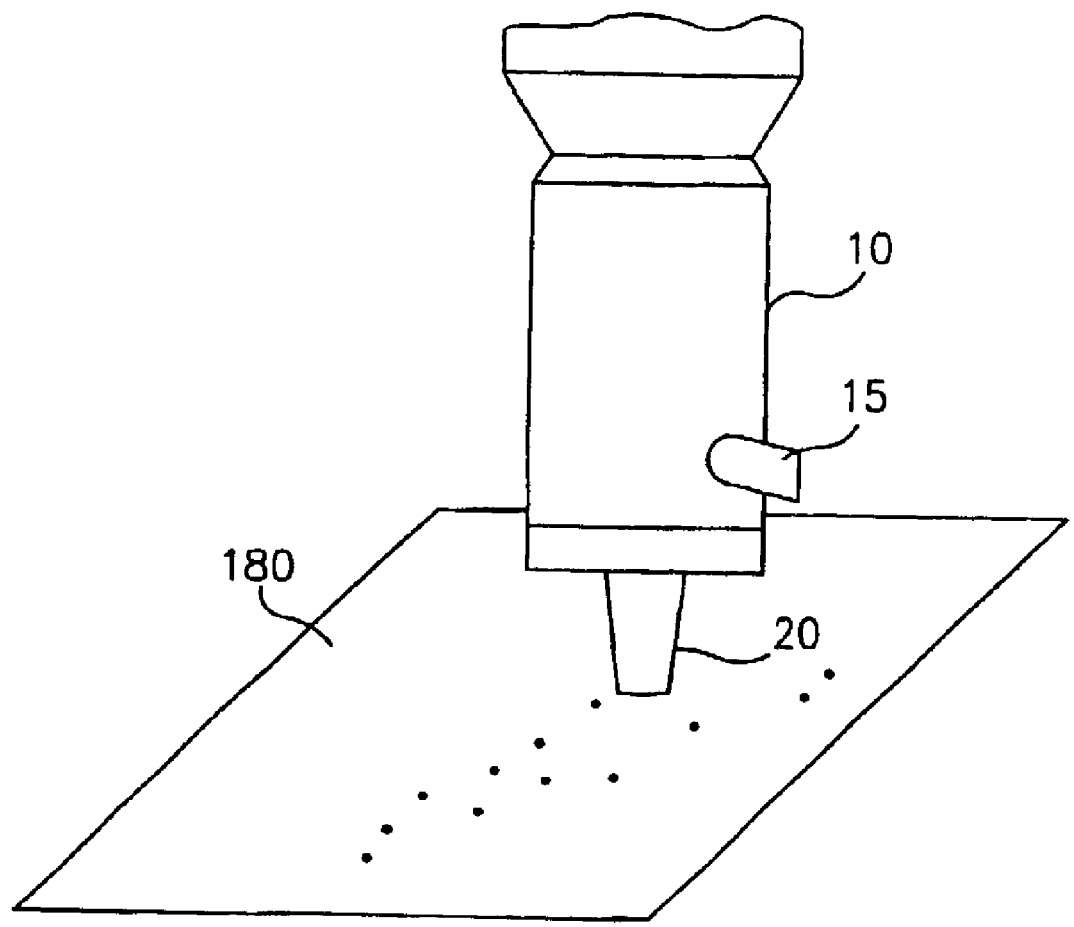
FIG. 5 depicts the combination basic tool holder shank and nosepiece marking a machined element.

FIG. 5 depicts a nosepiece 20 positioned in the nosepiece adapter 10 having a breather vent 15 and marking a work piece element 180.

Programming software is used to generate machine tool computer controller specific programs to command machine tool positioning and actuation of the marking apparatus. The software allows the programmer to define characteristics such as: text/symbol(s)/pattern(s) (hereinafter collectively referred to as "text") to be marked, font type(s), 3 axis (X, Y, Z) location(s) of text relative to work piece datum(s), size(s) of text, machine tool specific control codes, syntax, sequential or non-sequential marking modes, tool changer position and positions to move to/from at the beginning/end of the actual text marking cycle. Based on this data, the software will generate a controller type specific program (commonly called a letter address or "G" code program) that, when executed by the machine tool, exits the main program and executes the marking subprogram which (1) Turns the machine tool spindle off;
(2) Moves the machine tool spindle to the defined tool changer or other safe location;
(3) Commands a tool changer to load the marking apparatus into the machine tool spindle (if the machine tool is equipped with an automatic tool changer);
(4) Moves the machine tool spindle to the desired X, Y axis location for marking the first dot in the marking sequence and a Z axis retract position;
(5) Moves to the correct distance from the work piece marking surface required to produce desired depth of dot;
(6) Dwells at that X, Y location and actuates (1) extend/retract cycle of the marking head stylus;
(7) Moves to, dwells at, and actuates the marking head stylus cycle at subsequent X, Y dot locations required to complete the marking sequence;
(8) Returns to marking sequence X, Y start position;
(9) Returns to Z retract position; and,
(10) Returns to X, Y, Z tool change or safe position.

Once complete, the subprogram is exited and the execution of the main machining program continues.

It is intended, but not required, that the marking sequence program(s) be identified and stored in the machine tool controller, as a subprogram. The machine tool work piece machining program (main program) would be executed to perform the desired material removal process and would call for the marking subprogram(s) to be executed at a point defined by the user. Upon completion of the marking sequence, the marking subprogram would then command a return to the main program.

While the present invention has been illustrated and described with respect to a particular embodiment thereof, it should be appreciated by those of ordinary skill in the art that various modifications to this invention may be made without departing from the spirit and scope of the invention. For example, other basic tool holder shanks, other nosepieces, springs, and rotary coolant adapters may suitably employed.

What is claimed is:

1. A nosepiece adapter (10) for connecting a nosepiece (20) to a tool adapter end of a tool holder shank (30), wherein said nosepiece adapter (10) is comprised of:
   a) a shaft (60) and an opposing nosepiece end (50) to receive said nosepiece (20), wherein a longitudinal cavity (70) extends through said nosepiece adapter (10) and opens at both ends of said nosepiece adapter (10), wherein said shaft (60) includes a shaft attachment means for connecting said shaft (60) to said tool adapter end of said tool holder shank (30) and, wherein said nosepiece end (50) includes a nosepiece attachment means to connect said nosepiece (20) to said nosepiece end (50); and
   b) an escape valve cavity (80) extending from the outer surface of the nosepiece end (50) to said longitudinal cavity (70).

2. The nosepiece adapter (10) of claim 1, wherein said shaft attachment means is a Weldon style flat (155) and screw and wherein said nosepiece attachment means includes a plurality of threaded screw holes (170; 171; 172).

3. The nosepiece adapter (10) of claim 1, wherein said longitudinal cavity (70) is comprised of a shaft cavity (75) within said shaft (60) and a nosepiece cavity (73) within said nosepiece end (50).

4. The nosepiece adapter (10) of claim 3, wherein said nosepiece adapter (10) has an overall length equal to between about 3.0 and 4.0 inches, wherein said shaft (60) has an outer shaft diameter equal to between about 0.5 and 1.0 inches and a shaft length equal to between about 1.5 and 2.0 inches, wherein said shaft cavity (75) has an inner shaft diameter equal to between about 0.1 and 0.3 inches, and wherein said nosepiece end (50) has an outer nosepiece end diameter equal to between about 1.25 and 1.75 inches.

5. The nosepiece adapter (10) of claim 4, wherein said overall length of said nosepiece adapter equals 3.75 inches, said outer shaft diameter equals 0.75 inches, said shaft length equals 1.75 inches, said inner shaft diameter equals 0.1875 inches, and said outer nosepiece end diameter equals 1.5 inches.

6. The nosepiece adapter (10) of claim 4, wherein said nosepiece cavity (73) is further comprised of:
   a) a first longitudinal cavity (76) extending between about 1.5 and 1.8 inches from said nosepiece end (50) toward said shaft (60) and having a first inner diameter equal to between about 0.5 and 0.75 inches;
   b) a second longitudinal cavity (77) in communication with said first cavity (76) extending between about 0.1 and 0.2 inches from said first cavity (76) toward said shaft (60) and having a second inner diameter equal to between about 0.2 and 0.4 inches; and
   c) a third longitudinal cavity (78) in communication with said second cavity (77) extending toward and connecting with said shaft cavity (75) and having a third inner diameter equal to between about 0.1 and 0.3 inches.

7. The nosepiece adapter (10) of claim 6, wherein said escape valve cavity (80) is perpendicular to and connects with said first cavity (76) and wherein said escape valve cavity (80) has a through diameter equal to between about 0.2 and 0.4 inches.

8. The nosepiece adapter (10) of claim 7, wherein said first longitudinal cavity (76) extends about 1.634 inches from said nosepiece end (50) toward said shaft (60) and said first inner diameter equals about 0.630 inches, wherein said second longitudinal cavity (77) extends about 0.116 inches from said first cavity (76) toward said shaft (60) and said second inner diameter equals about 0.3125 inches; wherein said inner diameter of said third longitudinal cavity (78) equals about 0.1875 inches; and, wherein said escape valve cavity (80) has a through diameter equal to about 0.325 inches.

9. The nosepiece adapter (10) of claim 1, further comprise of a nosepiece (20) fitted into said nosepiece cavity (75), wherein said nosepiece (20) had a stylus (90) and a retraction means selected from the group consisting of one or more compression springs (95), a pneumatic air return, and an elastomeric element.

10. A combination tool holder shank (30) and nosepiece (20) comprised of:

a nosepiece adapter (10) having a shaft (60) and an opposing nosepiece end (50) receiving said nosepiece (20), a longitudinal cavity (70) extends through said nosepiece adapter (10) and opens on both ends of said nosepiece adapter, and an escape valve cavity (80) extends from the outer surface of the nosepiece end (50) into said longitudinal cavity (70), wherein said shaft (60) of said nosepiece adapter (10) is connected to the tool adapter end of the tool holder shank (30); and, wherein said nosepiece (10) positioned in said cavity (70) at said nosepiece end (50) is attached to said nosepiece end (50) of said nosepiece adapter (10) and has a stylus (90) and a retraction means.

11. The combination tool holder shank (30) and nosepiece (20) of claim 10, wherein said shaft (60) further includes a Weldon style flat (155) corresponding to a screw hole in said tool holder shank (30).

12. The combination tool holder shank (30) and nosepiece (20) of claim 10, wherein said tool adapter end of said holder shank (30) is an end mill holder and further includes a retention knob (120) with a coolant hole.

13. The combination tool holder shank (30) and nosepiece (20) of claim 10, further comprised of a coolant adapter (40) positioned between said tool holder shank and the tool adapter and a mounting block positioned between said coolant adapter and a machine tool.

14. A method of machining and marking a work piece element (180), comprising:

a) machining said element (180) using a machine tool having one or more tool holder shanks (30) each having a tool adapter end, wherein at least one tool adapter end is further comprised of a nosepiece adapter (10) having a nosepiece end (50) and an opposing shaft (60) fitted into a shank of said tool holder shank (60), wherein a longitudinal cavity (70) extends through said nosepiece adapter (10) and opens on both ends of said nosepiece adapter (10), and wherein an escape valve cavity (80) extends from the outer surface of the nosepiece end (50) to said longitudinal cavity (70), and wherein a nosepiece (20) having a stylus (90) and a retraction means is fitted into said nosepiece end (50); and, b) marking said element (180) by providing pneumatic gas of a first flow rate through said tool holder shank and said nosepiece adapter thereby extending said stylus to contact said machined element; and reducing said first flow rate thereby allowing said retraction means to retract said stylus.

15. The method of claim 14, wherein said step of marking is performed subsequent to said step of machining.

16. The method of claim 15, wherein said tool holder shank (30) further includes a retention knob (120) with a coolant hole and said pneumatic gas is provided through said retention knob.

17. The method of claim 15, wherein said pneumatic gas is provided via a coolant adapter (40) positioned between said tool holder shank and the tool adapter and a mounting block positioned between said coolant adapter and a machine tool.

\* \* \* \* \*